United States Patent [19]
Looi et al.

[11] Patent Number: 5,930,486
[45] Date of Patent: Jul. 27, 1999

[54] METHOD AND DEVICE FOR GRACIOUS ARBITRATION OF ACCESS TO A COMPUTER SYSTEM RESOURCE

[75] Inventors: Lily Pao Looi, Portland; Nitin Borkar; Frank Verhoorn, both of Beaverton, all of Oreg.

[73] Assignee: Intel Corporation, Santa Clara, Calif.

[21] Appl. No.: 08/707,884

[22] Filed: Sep. 9, 1996

[51] Int. Cl.⁶ .................................................. G06F 13/362
[52] U.S. Cl. .......................... 395/293; 395/291; 395/294; 395/728
[58] Field of Search .................................... 395/293, 291, 395/725, 800, 728, 294; 364/200

[56] References Cited

U.S. PATENT DOCUMENTS

| | | | |
|---|---|---|---|
| 4,837,682 | 6/1989 | Culler | 364/200 |
| 5,088,024 | 2/1992 | Vernon et al. | 395/725 |
| 5,151,994 | 9/1992 | Wille et al. | 395/800 |
| 5,581,782 | 12/1996 | Sarangdhar et al. | 395/800 |
| 5,623,672 | 4/1997 | Popat | 395/728 |
| 5,640,519 | 6/1997 | Langendorf et al. | 395/291 |
| 5,644,733 | 7/1997 | Kalish et al. | 395/293 |
| 5,740,380 | 4/1998 | LaBerge et al. | 395/287 |
| 5,809,538 | 9/1998 | Pollmann et al. | 711/151 |

*Primary Examiner*—Ayaz R. Sheikh
*Assistant Examiner*—Eric S. Thlang
*Attorney, Agent, or Firm*—Kenyon & Kenyon

[57] ABSTRACT

A computer system includes a priority arbitration scheme that prevents "hogging" of a bus by a priority agent. The computer system comprises at least one agent, at least one priority agent, a system resource, and a bus coupling the agent, priority agent, and system resource to one another. An arbiter is coupled to the bus, agent, and priority agent to receive request signals from the agent and the priority agent and to grant control of the bus to one of the agent and priority agent for access to the system resource. The priority agent is granted control of the bus whenever the priority agent asserts a request signal, as soon as the bus becomes next available. The priority agent relinquishes control of the bus to the agent, for a predetermined portion of the bus bandwidth, when a request signal is asserted by the agent.

12 Claims, 6 Drawing Sheets

Fig. 1.1
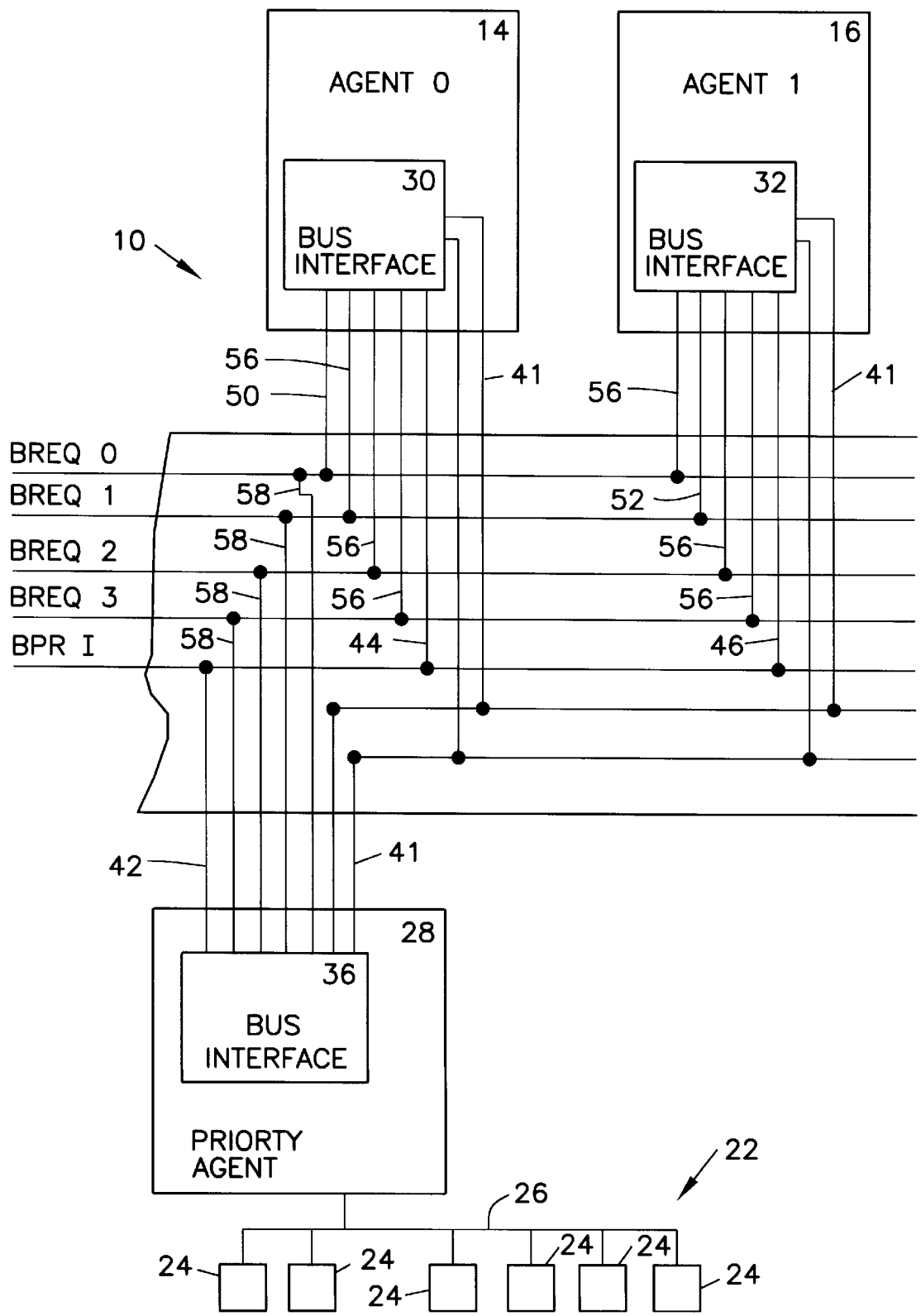

Fig. 1.2
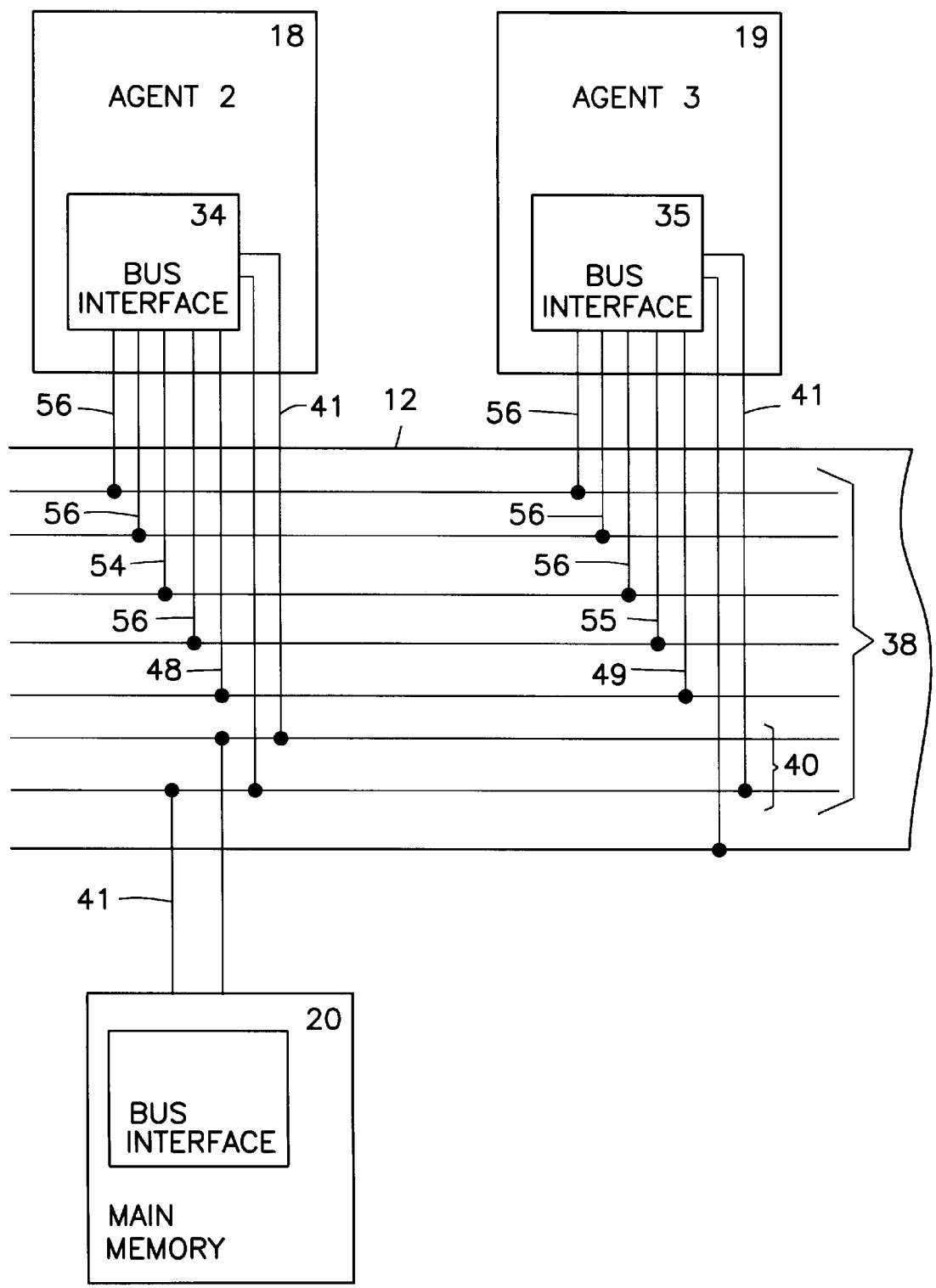

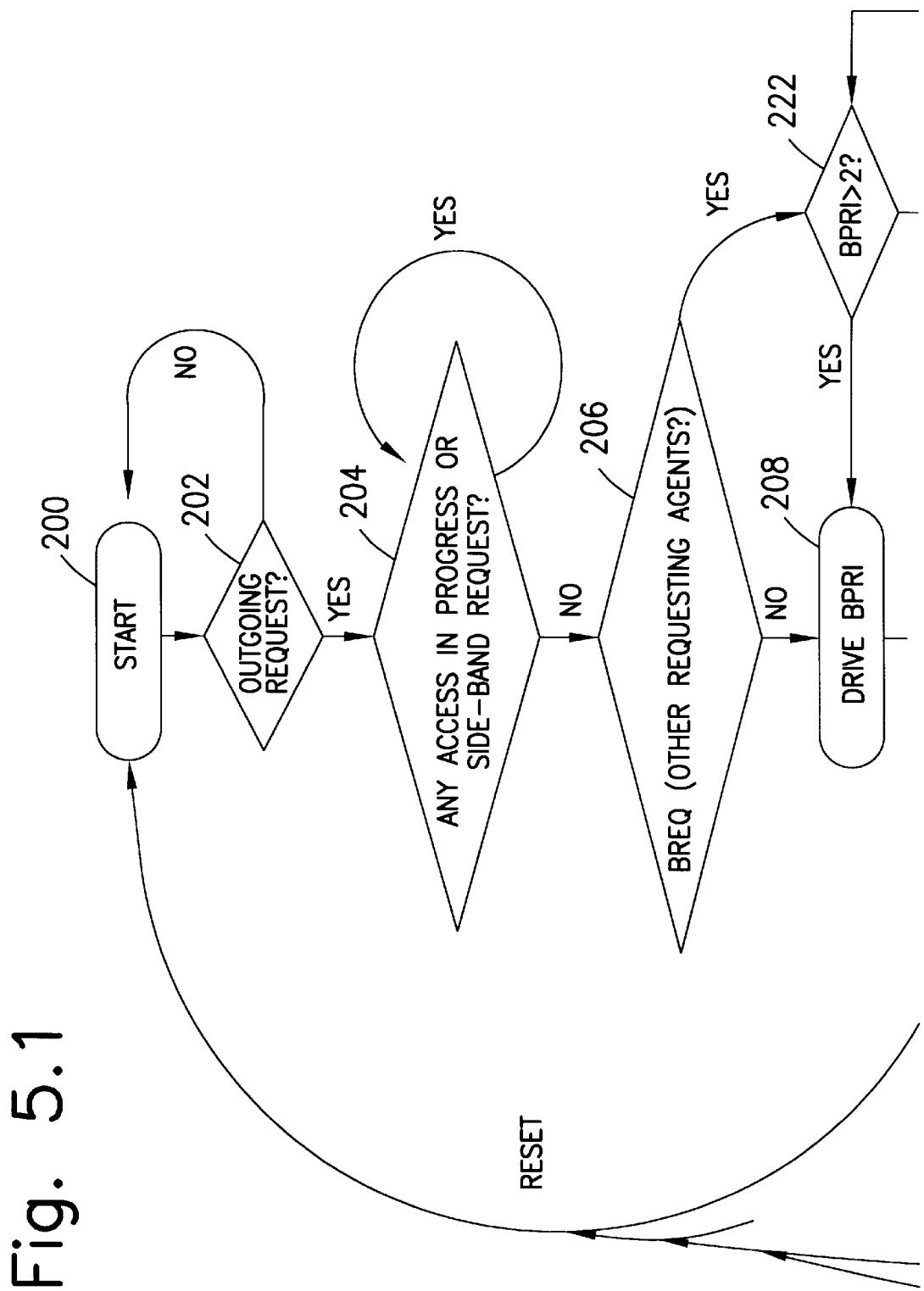
Fig. 5.1

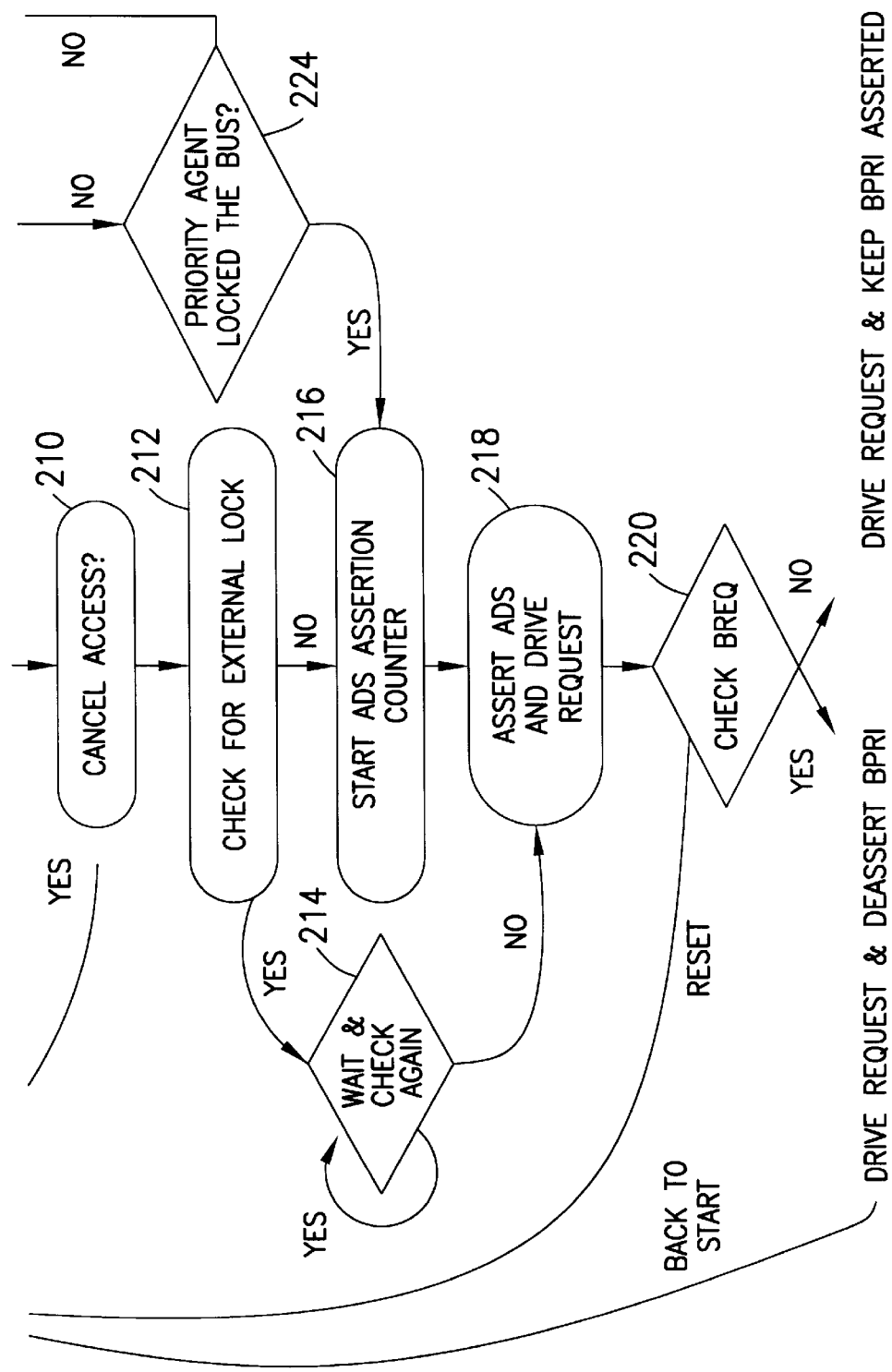
Fig. 5.2

5,930,486

METHOD AND DEVICE FOR GRACIOUS ARBITRATION OF ACCESS TO A COMPUTER SYSTEM RESOURCE

FIELD OF THE INVENTION

The present invention is directed to an arbitration scheme for use in a computer system or network. More particularly, the present invention provides an arbitration scheme that minimizes "hogging" of system resources by priority agents in the system.

BACKGROUND OF THE INVENTION

Modern computer systems and networks include multiple components that are coupled to one another for communication of control and status information and data. The components generally comprise agents and resources. An agent can comprise a component such as a processor that performs functions programmed by a user of the computer system. A resource can be a component available to agents in the system or on the network for support of the agents' functionality. An example of a resource is a main memory storing all of the instructions and data used by processor agents in the system. Each of the processor agents of the system accesses the main memory from time to time to retrieve instructions and data and to store processing results.

Arbitration schemes are implemented in modern computer systems to arbitrate between competing requests by agents for accesses to a system resource. For example, when more than one agent requires access to the main memory at the same time, the arbitration scheme determines which agent is granted first access to the resource. Typically, arbitration schemes are implemented as part of a bus protocol. A bus is a component that comprises one or more wires that couple the various components of the computer system to one another. The bus protocol controls access to and operation of the bus.

Each component coupled to the bus is operated according to the bus protocol in respect of asserting requests for the bus and control of the bus once access to the bus is granted by the arbitration scheme of the bus protocol. Whenever a component controls the bus it can then use the bus to communicate with any other component of the computer system coupled to that bus. Accordingly, when an agent requires access to the main memory, it will assert a request for the bus, wait for a grant of access to the bus by the arbitration scheme and, once access is granted, use the bus to retrieve or store data from or to the main memory.

There are many well known arbitration schemes used in modern computer systems. One such known scheme provides for a hierarchy among agents. For example, certain agents in the system are designated priority agents. A priority agent will always be granted access to the bus before any other non-priority agents.

Thus, whenever a priority agent requires the bus for access to a system resource, it will be granted control of the bus regardless of the needs of all of the non-priority agents in the system. While the priority agent approach to an arbitration scheme assures high performance for those agents given priority status by the system designers, there is a problem when the priority agent or agents have a continuing need for system resources over a period of time. During such times of continuing need, the priority agent will "hog" the bus to the exclusion of the non-priority agents of the system. This condition can denigrate performance of the functionality of the system implemented in the non-priority agents. Accordingly, there is a need for a priority based arbitration scheme to assure high performance by certain agents of the system, but which will also accommodate non-priority agents during periods of continuous domination of the bus by priority agents.

SUMMARY OF THE INVENTION

The present invention provides a priority arbitration scheme that overcomes the hogging problem of the known system. Generally, according to the present invention, the bus is monitored whenever a priority agent is in control of the bus, to determine if there are any pending requests for the bus by non-priority agents. If there are no pending requests, the priority agent continues to use the bus at the full bandwidth of the bus. However, if monitoring of the bus indicates that a request for the bus by a non-priority agent is pending, the arbitration scheme causes an allocation of a predetermined portion of the bus bandwidth to the non-priority agent to share the bus between the priority agent and the non-priority agent.

In this manner, the present invention accomplishes the high performance objective for priority agents by granting control of the bus to the priority agent, at least for a portion of the bus bandwidth, whenever the priority agent requests the bus. However, the priority agent cannot hog the bus because a non-priority agent in need of the bus will be granted access to the bus for a portion of the bus bandwidth, even during use of the bus by the priority agent.

BRIEF DESCRIPTION OF THE DRAWINGS

FIG. 1 is block diagram of a computer system including components coupled to one another by a system bus.

FIG. 5 is a state diagram of the bus interface of FIG. 4.

DETAILED DESCRIPTION

Figure 2:
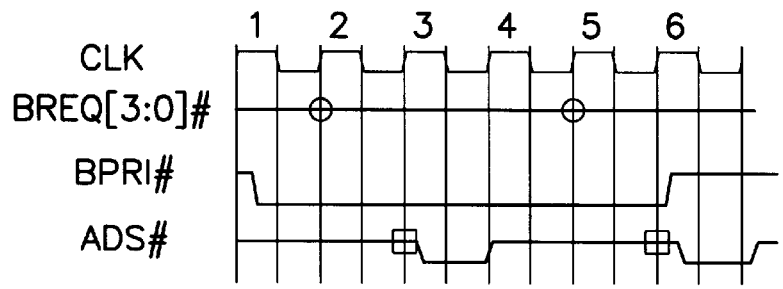
FIG. 2 is a timing diagram of operation of the bus of FIG. 1 when a priority agent is in control of the bus and there are no pending requests for the bus by a non-priority agent.

Referring now to the drawings, and initially to FIG. 1, there is illustrated a block diagram of an exemplary computer system generally indicated by the reference numeral 10. A main bus 12 couples a series of agents 14,16,18,19 to one another. The agents are designated as Agent 0 (14), Agent 1 (16), Agent 2 (18) and Agent 3 (19). Each agent 14,16,18,19 can comprise a processor or other functional component of the computer system 10. A main memory 20 is also coupled to the bus 12 and stores instructions and data used by the agents 14,16,18,19 during operation. In this regard, the main memory 20 is referred to as a resource of the computer system 12 since it is a component available to all of the agents of the system for performance of a service. In the case of the main memory 20, the service is the storage of instructions and data.

As is well known, the agents 14,16,18,19 use the main bus 12 to access the main memory 20 to retrieve instructions and data required to perform programmed functions and to store data representative of the results of agent performance.

A subsystem 22 comprises a set of components 24 which can also include processors and other functional components of the computer system 10. The components 24 are coupled to one another by a subsystem bus 26. A priority agent 28 couples the subsystem bus 26 to the main bus 12 so that any of the components 24 of the subsystem 22 can communicate with the agents 14,16,18,19 or access the main memory 20 via the priority agent 28, as is generally known.

Each of the agents 14,16,18,19 and the priority agent 28 includes a bus interface 30,32,34,35,36 that controls access to and operation of the main bus 12. The bus interfaces 30,32,34,35,36 can operate according to any known bus protocol such that at any one time only one of the agents 14,16,18,19 or the priority agent 28 controls the main bus 12.

In the exemplary embodiment of the invention illustrated in FIG. 1, the main bus 12 comprises a set of lines 38 used to transmit addresses, data and control information between the components coupled to one another by the bus. The number and configuration of the address, data and control information lines of the main bus 12 are not of significance to the present invention, and are designated generally by the reference numeral 40. The lines 40 can be implemented in accordance with any known bus design and the agents 14,16,18,19, main memory 20 and priority agent 28 are each coupled to the lines 40 by lines 41.

As shown in FIG. 1, the main bus 12 also includes a set of lines designated as BREQ0, BREQ1, BREQ2, BREQ3 and BPRI. These lines are utilized to implement an arbitration scheme for controlling access to the main bus 12. As discussed above, only one agent at a time is granted control of the main bus 12 for communication with, e.g., the main memory 20. Bus protocols typically include an arbitration scheme to determine which agent is granted access to the bus when more than one agent requires access to the bus at the same time. In the exemplary embodiment of the present invention, a hierarchial arbitration scheme is implemented to give priority to the priority agent 28 so that the priority agent 28 can access the main bus 12 on behalf of the subsystem 22 whenever a component 24 requires the main bus 12.

To that end, the bus interface 36 of the priority agent 28 is coupled to the BPRI line of the main bus 12 by a line 42. Moreover, the bus interfaces 30,32,34,35 of the agents 14,16,18,19 are also coupled to the BPRI line by lines 44,46,48,49, respectively. Whenever the priority agent 28 requires access to the main bus 12, the bus interface 36 asserts a signal on the BPRI line. The bus interfaces 30,32, 34,35 monitor the BPRI line via the lines 44,46,48,49 and refrain from bus operations whenever a signal is detected on the BPRI line. In this manner, the priority agent 28 is always able to obtain control of the main bus 12.

Each of the agents 14,16,18,19 is also provided with a dedicated request line for use by the agents 14,16,18,19 in connection with requests for the main bus 12. The BREQ0 line is dedicated to the agent 14 (Agent 0) and coupled to the bus interface 30 of agent 14 via a line 50. The BREQ1 line is dedicated to the agent 16 (Agent 1) and coupled to the bus interface 32 of agent 16 via a line 52. The BREQ2 line is dedicated to the agent 18 (Agent 2) and coupled to the bus interface 34 of agent 18 via a line 54. The BREQ3 line is dedicated to the agent 19 (Agent 3) and coupled to the bus interface 35 of agent 19 via a line 55. Whenever an agent 14,16,18,19 requires access to the main bus 12, the bus interface 30,32,34,35 of the agent 14,16,18,19 asserts a signal on the respective dedicated line (BREQ0, BREQ1 BREQ2 or BREQ3, as the case may be).

In the exemplary embodiment of the present invention, the agents 14,16,18,19 arbitrate for the main bus 12 according to a round robin scheme. The round robin scheme is implemented via the individual bus interfaces 30,32,34,35 of the agents 14,16,18,19. Each of the bus interfaces 30,32,34, 35 is coupled to the dedicated request lines of the other agents 14, 16,18,19 by lines 56, to monitor requests asserted by the other agents 14,16,18,19. When an agent requires the main bus 12, the respective bus interface 30,32,34,35 asserts a signal on the corresponding dedicated request line. The other bus interfaces 30,32,34,35 detect the signal via the lines 56 and store the request. The bus interface 30,32,34,35 that acquired control of the main bus 12 will not request the bus again until it has detected a request by each of the other agents 14,16,18,19 on their respective bus request lines to thereby enforce the round robin scheme.

In this manner, each agent 14,16,18,19, after acquiring control of the main bus 12, waits until all of the other agents have had an opportunity to use the main bus 12 before once again seeking control of the bus. Various time-out schemes can be imposed on the round robin scheme to permit an agent to request the main bus 12 before each of the other agents has asserted a request, if none of the other agents has asserted a request before the expiration of a predetermined time period. The time-out approach makes the bus available out of the round robin order when the other agents in fact do not require the bus.

Of course, the round robin scheme among the agents 14,16,18,19 is interrupted whenever the priority agent 28 asserts a signal on the BPRI line. When a signal is asserted on the BPRI line, the bus interfaces 30,32,34,35 of the agents 14,16,18,19 suspend all bus operations until the signal is dropped from the BPRI line by the priority agent 28.

In accordance with the present invention, the bus interface 36 of the priority agent 28 is also coupled to each of the BREQ0, BREQ1, BREQ2 and BREQ3 lines by lines 58. The lines 58 permit the priority agent 28 to monitor the request lines of the agents 14,16,18,19 to determine when an agent 14,16,18,19 requires the main bus 12.

Referring now to FIG. 2, there is illustrated a timing diagram of operation of the main bus 12 when the priority agent 28 is in control of the bus and there are no pending requests for the bus by a non-priority agent. A system clock signal CLK is shown at the top of the timing diagram. The next line of the timing diagram represents the BREQ lines of the agent round robin arbitration scheme described above with respect to FIG. 1. As shown in FIG. 2, the BREQ line remains unasserted throughout the illustrated period of the system clock CLK, indicating that none of the agents 14,16,18,19 require the main bus 12. In this case, the BPRI line can be asserted by the priority agent 28 repeatedly for as many bus transactions as required by the priority agent 28. In the example of FIG. 2, the BPRI signal is continuously asserted from clock period 1 to clock period 6.

An ADS line represents an address strobe counter signal according to the bus protocol. The address strobe signal indicates to the component in control of the main bus 12 that address information is to be placed on the appropriate lines 40. The address information represents the component with whom the controlling agent wants to communicate. As shown in FIG. 2, the address strobe is asserted, deasserted and again asserted during the time of assertion of the BPRI signal, indicating several consecutive bus transactions by the priority agent 28. The priority agent 28 is free to complete as many bus transactions as it wants, so long as there are no requests by any of the agents 14,16,18,19.

Figure 3:
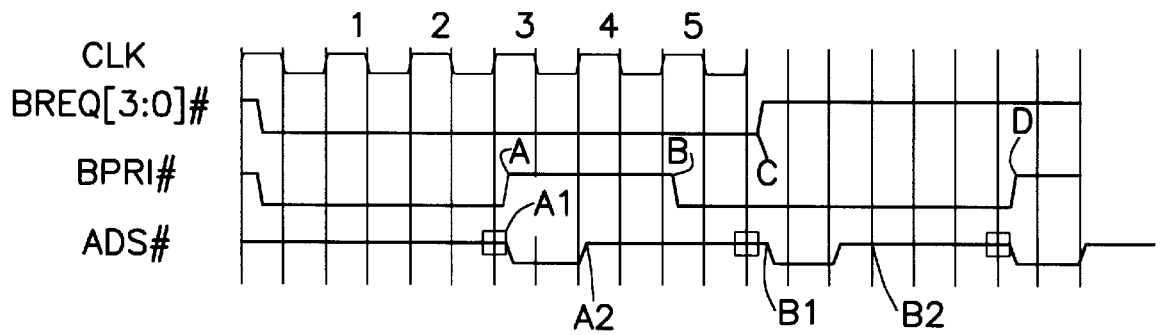
FIG. 3 is a timing diagram of operation of the bus of FIG. 1 according to the present invention, when a priority agent is in control of the bus and there is a pending request for the bus by any one of the non-priority agents.

FIG. 3 is a timing diagram of operation of the main bus 12 when the priority agent 28 is asserting a signal on the BPRI line and one of the agents 14,16,18,19 is asserting a signal on the respective BREQ lines. According to the priority arbitration scheme, the agent 14,16,18,19 asserting the signal suspends bus operation as long as the signal is asserted on the BPRI line. Pursuant to the present invention, the priority agent 28 monitors the BREQ lines to detect a bus request by one of the agents 14,16,18,19.

In the example of FIG. 3, the BREQ lines indicate a bus request that is asserted by one of the agents 14,16,18,19 simultaneously with the assertion of a signal on the BPRI line by the priority agent 28. Due to the priority arbitration scheme, control of the main bus 12 is taken by the priority agent 28, while the agent 14,16,18,19 in need of the bus waits until the signal is dropped from the BPRI line before taking control of the main bus 12. The assertion of a signal on the ADS line is related to address information for the priority agent bus transaction. However, the monitoring of the BREQ lines by the priority agent 28 causes the priority agent 28 to detect the bus request on BREQ, and de-assert the BPRI signal after a predetermined amount of the bus bandwidth.

As illustrated in FIG. 3, the exemplary embodiment of the present invention allocates 50% of bus bandwidth between the priority agent 28 and the other agents 14,16,18,19. Thus, the signal on the BPRI line is dropped at point A since the BREQ line remains in the asserted condition. The ADS signal is also deasserted at point A1, and reasserted at point A2 for address information related to the agent bus transaction. The priority agent 28 reasserts a signal on the BPRI line at point B, giving the agent 14,16,18,19 a time period equal to 50% of the bandwidth of the main bus 12 to control the main bus 12 for bus transactions required by the agent 14,16,18,19.

At point B, the priority agent 28 assumes control of the main bus 12, after the ADS signal relevant to the agent transaction is deasserted, at point B1. The ADS signal is reasserted at point B2 for the priority agent bus transaction. The priority agent 28 continues to monitor the BREQ lines for requests by the agents 14,16,18,19, and will relinquish control of the main bus 12 for 50% of the bus bandwidth, as described above, so long as there are any requests by the agents 14,16,18,19. In this manner, the priority agent 28 will always have access to the main bus 12, whenever needed, but will never hog the bus to the exclusion of the agents 14,16,18,19.

In the illustration of FIG. 3, the signal on the BREQ lines is dropped at point C. Point C is within the 50% allocation of the priority agent 28, so control of the bus had not yet been given to the appropriate agent 14,16,18,19. Since the request indication on the BREQ lines is dropped at point C, the BPRI line remains asserted so long as the priority agent 28 requires the main bus 12, as shown in FIG. 3. At point D in the example of FIG. 3, the priority agent 28 no longer requires the main bus 12, so the signal on the BPRI line is dropped. At point D either of the priority agent 28 or the next agent 14,16,18,19 under the round robin scheme can request the main bus 12. Again, if both the priority agent 28 and any agent 14,16,18,19 require the main bus 12 at the same time, the priority agent 28 is granted control and relinquishes 50% of the bandwidth whenever a request for the bus is also indicated on the BREQ lines.

It should be noted that there can be more than one priority agent in the computer system. In such a case, the bandwidth allocation between priority and non-priority agents may be adjusted in a manner that allows some priority agents to hog the bus, and prevent other priority agents form hogging the bus pursuant to the present invention. An additional arbitration scheme can be implemented between the priority agents to determine, as between them, which is granted control of the bus at any one time.

Figure 4:
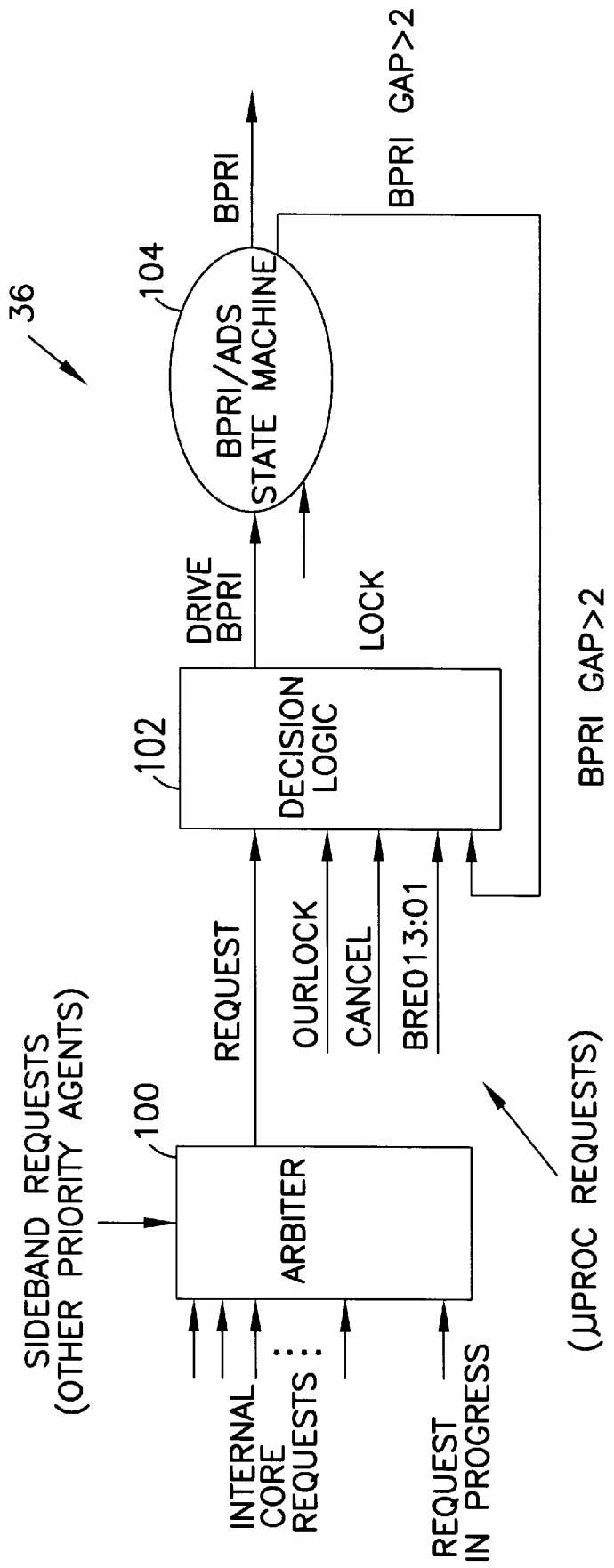
FIG. 4 is block diagram of an exemplary embodiment of the bus interface of the priority agent of the computer system of FIG. 1.

Referring now to FIG. 4, there is illustrated a block diagram of an exemplary embodiment of the bus interface 36. An arbiter 100 includes internal core inputs corresponding to requests from the components 24 for access to the main bus 12. The arbiter 100 can implement any known arbitration scheme to determine access to the main bus 12 as between competing requests from among the components 24. Sideband requests shown in FIG. 4 represent requests from other priority agents of the system which are either made subject to the arbitration scheme implemented in the arbiter 100 or are given priority over requests from the components 24.

Upon completion of an arbitration, the arbiter 100 outputs a Request signal to a Decision Logic 102. The Decision Logic 102 is arranged to receive as inputs each of the Request signal from the arbiter 100, the BREQ lines 58, a lock signal from the priority agent 28, a cancel signal, and a BPRI Gap>2 signal, as will be described with respect to FIG. 5.

The cancel signal is asserted by the computer system, in a known manner, to indicate cancellation of a bus transaction. The lock signal indicates wether the priority agent 28 has asserted a lock on the main bus 12. A bus lock is a feature of bus protocols that indicates a bus transaction or series of bus transactions that are not to be interrupted. Any component coupled to the main bus 12 can assert a lock signal when required by the nature of the bus transaction or transactions, to prevent the bus from being taken away from the component before completion of the bus transaction or transactions. The lock signal input to the Decision Logic 102 (labeled as "our lock") relates only to locks by the priority agent 28.

The Decision Logic 102 outputs a Drive BPRI signal, as a function of the Request, BPRI Gap>2, BREQ, lock and cancel inputs, as will be described below. The Drive BPRI signal is received as an input by a BPRI/ADS state machine 104 to cause the BPRI/ADS state machine 104, upon satisfaction of certain conditions to be discussed below, to output the BPRI signal (indicating a request for the main bus 12). The BPRI/ADS state machine 104 also outputs the BPRI Gap>2 signal, two system clock cycles after the last assertion of the BPRI signal, to implement the arbitration scheme of the present invention, as will appear. The BPRI signal output by the BPRI/ADS state machine 104 is coupled to the BPRI line of the main bus 12 (FIG. 1), and the BPRI Gap>2 signal is coupled to an input of the Decision Logic 102, as discussed above. The BPRI/ADS state machine 104 also receives as inputs system signals relating to other bus locks, and so on, which signals act to suspend the state machine 104 while asserted, as will appear.

FIG. 5 illustrates a state diagram relating to the overall logic of the bus interface 36 system shown in FIG. 4. From a Start state 200, the bus interface transitions to an Outgoing request inquiry 202. This state ascertains whether a Request signal has been output by the arbiter 100 to the Decision Logic 102, indicating that the priority agent 28 must obtain control of the main bus 12. The Decision Logic 102 loops between states 202 and 200 until a Request signal is detected as an output of the arbiter 100. When a Request signal is detected in state 202, the Decision Logic 102 transitions to an Access in progress or Sideband request? state 204. This state inquires as to whether a bus transaction is already in progress, or if there is a sideband request from another priority agent.

If either of these inquiries is in the affirmative, the Decision Logic 102 loops within the state 204 until both of the inquiries are negative. At that point, the state 204 transitions into a BREQ? state 206. The BREQ? state 206 inquires as to wether there is an input to the Decision Logic 102 from any of the BREQ lines 58 of the main bus 12 (see FIGS. 1 and 4), indicating a request by one of the agents 14,16,18,19.

If the BREQ? state 206 determines that there is no BREQ signal asserted on any of the lines 58, the Decision Logic 102 outputs the Drive BPRI signal to the BPRI/ADS state machine 104 (see FIG. 4), indicated on the state diagram of FIG. 5 as a transition to a Drive BPRI state 208. The Drive BPRI state 208 transitions to a Cancel Access state 210 to determine if a cancel signal is being input to the BPRI/ADS state machine 104. If a cancel signal is asserted, the Cancel Access state 210 transitions back to the Start state 200. If there is no cancel signal, the Cancel Access state 210 transitions to a Check for External Lock state 212.

The state 212 determines whether there are any locks asserted by other components on the bus. A lock causes the state 212 to transition to a Wait and Check state 214 which loops within itself until the lock is dropped.

If there is no lock, the state 212 transitions to a Start ADS Counter state 216, which transitions to an Assert ADS and Drive Request state 218 after counting a preselected number of clock cycles, e.g., two cycles. The Wait and Check state 214 also transitions to the Assert ADS and Drive Request state 218 after the lock is dropped.

The Assert ADS and Drive request state 218 transitions to a Check BREQ state 220, which determines wether any of the agents 14,16,18,19 have asserted a request for the main bus 12 since state 206, via the BREQ lines 58, as discussed above. A reset line is shown from the Check BREQ state 220 to the Start state 200 as an example of the result of a reset. A reset can be generated by the computer system at any time and causes a transition to the Start state 200 from any state at the time of the reset.

If a BREQ signal is indicated, the Check BREQ state 220 causes the BPRI/ADS state machine 104 (FIG. 4) to grant the main bus 12 to the priority agent 28 (drive request), but to deassert BPRI after 50% of the bus bandwidth (e.g., two system clock cycles), to permit the requesting agent 14,16,18,19 access to the main bus 12.

If a BREQ signal is not indicated, the Check BREQ state 220 causes the BPRI/ADS state machine 104 to grant the main bus 12 to the priority agent 28, and to keep BPRI asserted.

In either case, the state 220 transitions back to the Start state 200 to again determine the state of the BPRI/ADS state machine 104. If the state of the BPRI/ADS state machine 104 is set to keep BPRI asserted, and there are no outgoing requests, the Outgoing request state 202 causes a deassertion of BPRI.

Returning to the BREQ? state 206, if it is determined that there is a BREQ signal asserted on any one of the lines 58, the state 206 transitions to a BPRI Gap>2 state 222. The state 222 measures the time gap between the last assertion of BPRI and the present clock cycle. If the gap is less than two system clock cycles, the BPRI Gap>2 state 222 transitions to a Priority Agent Lock? state 224. The state 224 determines whether the priority agent 28 has asserted a lock on the main bus 12 during the last request for the bus. If a lock has been asserted, the Priority Agent Lock? state 224 transitions directly to state 216, for bus grant processing as described above. If no lock has been asserted, the Priority Agent Lock? state 224 transitions back to the BPRI Gap>2 state 222.

When the BPRI Gap>2 state 222 determines that more than two system clock cycles has elapsed since the last assertion of the BPRI signal, the state 222 transitions back to state 208, for bus grant processing as described above. A gap of more than two system clock cycles since a last BPRI assertion, after determination of a BREQ signal in state 206, indicates that the priority agent 28 is not hogging the main bus 12, and thus, granting of the bus to the priority agent 28 can proceed. If it has been less than two clock cycles since the last assertion of BPRI, the BPRI/ADS state machine 104 transitions between states 222 and 224 until more than two clock cycles have elapsed, to allow the agent 14,16,18,19 requesting the bus access to the main bus 12. Of course, this is subject to assertion of a lock by the priority agent 28, as determined in state 224. When both states 222 and 224 indicate a negative, and BPRI is asserted, BPRI will be deasserted to permit access to the main bus 12 by the agent 14,16,18,19.

The present invention therefore provides a gracious solution to the hogging problem by always granting bus control to priority agents when needed, but allowing non-priority agents access to the bus for a predetermined bandwidth allocation period, e.g. 50%, during priority agent control. This assures ready access to the bus by priority agents whenever needed, but precludes an exclusion of non-priority agents from bus access.

We claim:

1. A computer system having an arbitration scheme to control access to a system resource, comprising:

at least one agent;

at least one priority agent;

a system resource; and a bus coupling the agent, priority agent and system resource to one another;

the bus operating at a bandwidth and including a priority request arrangement and an agent request arrangement coupled to the priority agent and the agent to determine control of the bus by one of the priority agent and the agent;

the priority agent asserting a request signal on the priority request arrangement whenever the priority agent requires the bus, and taking control of the bus, when the bus is next available;

the agent asserting a request signal on the agent request arrangement whenever the agent requires the bus for access to the system resource;

the priority agent relinquishing control of the bus when a request signal is asserted on the agent request arrangement, for a predetermined portion of the bandwidth of the bus;

the agent taking control of the bus during the predetermined portion of the bandwidth of the bus for access to the system resource.

2. The computer system of claim 1 wherein the predetermined portion of the bandwidth of the bus comprises 50% of the bandwidth.

3. The computer system of claim 1 wherein the agent comprises a processor.

4. The computer system of claim 3 wherein the system resource comprises a main memory.

5. The computer system of claim 1 wherein the agent request arrangement comprises a round robin arbitration scheme.

6. The computer system of claim 1 wherein each of the agent and priority agent includes a bus interface, each coupled to the agent request arrangement and the priority request arrangement for asserting request signals and for monitoring the assertion of request signals and controlling bus access as a function of asserted request signals to cause:

the priority agent to take control of the bus when the priority agent requires the bus for access to the system resource;

the priority agent to relinquish control of the bus when a request signal is asserted on the agent request arrangement, for a predetermined portion of the bandwidth of the bus; and the agent to take control of the bus during the predetermined portion of the bandwidth of the bus.

7. A computer system having an arbitration scheme to control access to a system resource, comprising:

at least one agent;

at least one priority agent;

a system resource; and a bus coupling the agent, priority agent and system resource to one another;

the bus operating at a bandwidth and including a priority request arrangement and an agent request arrangement coupled to the priority agent and the agent to determine control of the bus by one of the priority agent and the agent;

the priority agent asserting a request signal on the priority request arrangement whenever the priority agent requires the bus, and taking control of the bus, when the bus is next available;

the agent asserting a request signal on the agent request arrangement whenever the agent requires the bus for access to the system resource;

the priority agent relinquishing control of the bus when a request signal is asserted on the agent request arrangement, for a predetermined portion of the bandwidth of the bus;

the agent taking control of the bus during the predetermined portion of the bandwidth of the bus for access to the system resource;

wherein the agent comprises a processor, and the computer system further comprises a subsystem bus; and wherein the priority agent comprises a coupling between the subsystem bus and the bus.

8. A computer system, comprising:

at least one agent;

at least one priority agent;

a system resource;

a bus coupling the agent, priority agent and system resource to one another; and an arbiter coupled to the bus, agent and priority agent to receive request signals from the agent and the priority agent and to grant control of the bus to one of the agent and priority agent for access to the system resource, such that;

the priority agent is granted control of the bus, when the bus is next available, whenever the priority agent asserts a request signal, for access to the system resource;

the priority agent relinquishes control of the bus when a request signal is asserted by the agent, for a predetermined portion of the bandwidth of the bus; and the agent is granted control of the bus during the predetermined portion of the bandwidth of the bus.

9. The computer system of claim 8, wherein the arbiter comprises a bus interface in each of the agent and priority agent.

10. The computer system of claim 8 wherein the predetermined portion of the bandwidth of the bus comprises 50% of the bandwidth.

11. A method for operating a computer system including at least one agent, at least one priority agent, a system resource and a bus coupling the agent, priority agent and system resource to one another, comprising the steps of:

operating the agent to assert a request signal whenever the agent requires the bus for access to the system resource;

operating the priority agent to assert a request signal whenever the priority agent requires the bus for access to the system resource;

granting control of the bus to the priority agent, when the bus is next available, whenever the priority agent asserts a request signal;

causing the priority agent to relinquish control of the bus when a request signal is asserted by the agent, for a predetermined portion of the bandwidth of the bus; and granting control of the bus to the agent during the predetermined portion of the bandwidth of the bus.

12. The method of claim 11 wherein the predetermined portion of the bandwidth of the bus comprises 50% of the bandwidth.

* * * * *

UNITED STATES PATENT AND TRADEMARK OFFICE
CERTIFICATE OF CORRECTION

PATENT NO. : 5,930,486
DATED : July 27, 1999
INVENTOR(S) : Lily Pao Looi, et al.

It is certified that error appears in the above-identified patent and that said Letters Patent is hereby corrected as shown below:

Column 2, line 31      "is block" should be --is a block--

Column 7, line 5      "wether" should be --whether--

Column 7, line 31      "wether" should be --whether--

Column 8, line 2      "has" should be --have--

Signed and Sealed this

Nineteenth Day of September, 2000

Q. TODD DICKINSON

*Attest:*

*Attesting Officer*      *Director of Patents and Trademarks*